United States Patent Office 3,560,217
Patented Feb. 2, 1971

3,560,217
IRON OR COPPER COMPOUND CATALYTIC DECOMPOSITION OF THIOGLUCOSIDES IN RAPESEED
Clarence George Youngs, Henry R. Sallans, and John Milton Bell, Saskatoon, Saskatchewan, Canada, assignors to Canadian Patents and Development Limited, Ottawa, Ontario, Canada
No Drawing. Filed Feb. 7, 1968, Ser. No. 703,562
Claims priority, application Canada, Feb. 21, 1967, 983,424
Int. Cl. A23k 1/00; A23j 1/14
U.S. Cl. 99—2                                          18 Claims

ABSTRACT OF THE DISCLOSURE

A process for the treatment of oil seeds of certain of the cruciferae family, such as rape and mustard to produce a proteinaceous product suitable for use in animal feedstuffs whereby in addition to the usual steps of crushing the seed, dry cooking the crushed seed to increase the permeability of the cell walls thereof to oil, recovering oil from the crushed meal and drying the de-oiled meal, there is included the step of decomposing the thioglucosides by catalytic treatment with a compound of iron or copper at a temperature between from about 200° to 275° F. and at a moisture content of at least about 15%.

BACKGROUND OF THE INVENTION

Field of the invention

This invention relates to a process for the elimination of thioglucosides in oil seeds of certain of the cruciferae family, such as rape and mustard. The oil seeds of the cruciferae family, such as rape and mustard contain both thioglucosides and the enzyme myrosinase capable of hydrolyzing the thioglucosides. The intact thioglucosides have less effect on animals than some of the hydrolysis products.

The processing of rapeseed to leave intact the thioglucosides in the meal gives a product which is acceptable for inclusion in certain animal feeds. However, for some classes of animals only very limited amounts of such meal are recommended. Such a meal also possesses the disadvantage that there is the possibility of reintroducing myrosinase into the feed, for instance in screenings which contain mustard or rapeseed. Thus, a process in which the thioglucosides are actually removed would give a wider market and better acceptance for this meal.

The use of rapeseed meal as a protein supplement in livestock and poultry rations has often resulted in adverse effects on growth and reproduction. There have been appreciable differences, however, according to animal species, age and sex, as well as method of processing of rapeseed for oil extraction and meal preparation; species or variety of rape; year the crop was grown and other factors.

The development of growth-inhibiting properties in rapeseed meal appears to be dependent upon hydrolysis of thioglucosides into isocyanates (3-butenyl and 4-pentenyl) and oxazolidinethione. The hydrolysis can be effected by the enzyme myrosinase, normally present in unheated rapeseed and more recently shown to occur in the gastrointestinal tract of certain animals, where it is produced by certain bacteria, especially by E. coli and A. aerogenes.

DESCRIPTION OF PRIOR ART

In the present processing of rapeseed, conditions are used during cooking of the seed which inactivate the enzyme with a minimum of hydrolysis of the thioglucosides. The types of processing presently employed include: (a) expeller pressing, (b) prepressing plus solvent extraction, and (c) direct solvent extraction.

The "expeller pressing" process involves the mechanical crushing of the seed, and subsequent cooking to make any remaining intact cell walls more permeable to oil. The cooked meal is then subjected to the expeller or screw press whereby the oil content of the hot, dry cake is reduced usually to about 4 percent but may range up to 6 or 7 percent. Comminution of the cake makes it ready for marketing. In the "prepressing plus solvent extraction" process a portion of the oil is removed from the seed by pressing with expellers and the remaining oil is then extracted with an organic solvent in a continuous countercurrent extraction process. The meal is then desolventized wtih the resulting product containing around 1% lipid and having a moisture content of 10 to 12%, and is ready for marketing. In the "direct solvent extraction" process or "filtration-extraction" process the crushed, cooked seed is fed continuously into a horizontal, cylindrical tank and conveyed down its length as a slurry with the miscella (solvent plus oil) and slowly agitated to accomplish maximum extraction of the oil with minimum disintegration of the meal. The slurry is then filtered on a horizontal rotating filter and desolventized. The resulting marketable meal has the same lipid and moisture content as that produced by the previous process.

In the treatment of mustard meal, water and myrosinase may be added to the meal after oil extraction. Hydrolysis is allowed to proceed and the steam volatile hydrolysis product is removed by steaming. A somewhat similar process has been described in which the natural enzyme in mustard is allowed to work before oil extraction and again the steam volatile hydrolysis product is removed by steam distillation. Enzymatic hydrolysis after oil extraction involves the addition and removal of rather large amounts of water and appears at present to be unattractive economically. Enzymatic hydrolysis before oil removal, in the case of rapeseed, introduces material into the oil which subsequently interferes with hardening of the oil for use in margarines and shortenings. Also the treatment does not remove the oxazolidinethione which is goitrogenic and which is formed in the enzyme treatment of rapeseed meal.

An ammoniation process for crambe meal has recently been described but it is still too soon to obtain a proper evaluation of the process. As described it requires approximately 2 hours which would necessitate equipment with a large hold-up for commercial operation.

SUMMARY OF THE INVENTION

It has now been found that certain metal compounds will decompose the thioglucosides in oil seed meals to give organic nitriles rather than the isothiocyanates and oxazoladinethion formed on enzymic hydrolysis. The nitriles corresponding to the isothiocyanates are mostly more volatile than the isothiocyanates and these are readily steam stripped from the meal. A hydroxynitrile corresponding to the oxazolidinethione is only slightly steam volatile and the bulk of this material remains in the meal. This hydroxynitrile is toxic to animals if incorporated into the diet at too high a level, and the process is, therefore, not applicable to meals containing high amounts of the glucoside "progoitrin," which gives rise to oxazolidinethione on enzymatic hydrolysis and the hydroxynitrile on decomposition with the metal compounds. The "progoitrin" content of meals to be processed as described should not exceed about 2.0%, corresponding to a hydroxynitrile content of about 0.5% by weight. Meals which can be successfully treated include for instance turnip rape, Brassica campestris var. oleifera f. annua (frequently referred to as Polish type in Canadian literature) and Brown or Oriental Mustard, Brassica juncia.

According to the present invention, a process is provided for the treatment of oil seeds containing thioglucosides to produce a proteinaceous product suitable for use in animal feedstuffs whereby in addition to the conventional and previously described steps of crushing the seed, dry cooking the crushed seed to increase the permeability of the cell walls thereof to oil, recovering oil from the crushed meal and drying the de-oiled meal, there is included the step of decomposing the thioglucosides by catalytic treatment with a compound of iron or copper at a temperature between about 200° to 275° F. and at a moisture content of at least about 15%.

DESCRIPTION OF PREFERRED EMBODIMENTS

Metal compounds which are particularly effective are the soluble compounds, preferably salts, of iron and copper, alone or in combination, such as ferrous sulphate, ferric chloride and copper sulphate.

The quantities of the above compounds required to produce the catalytic effect may range from 0.01% to 0.4% of the meal calculated as the metal, whether iron or copper. When a mixture of iron and copper compounds is used the total weight of metal should be within this range. In the case of the $FeSO_4$ and $CuSO_4$ the range may vary from 0.03% to 0.4%. In a preferred embodiment of the invention, $FeSO_4 \cdot 7H_2O$ or $CuSO_4 \cdot 5H_2O$ or a mixture thereof is used $FeSO_4 \cdot 7H_2O$ would be employed in a concentration of 0.045 to 2.0% by weight, and $$CuSO_4 \cdot 5H_2O$$

in a concentration of 0.04 to 1.6% by weight. In general, the minimum necessary amount of metal salt to be added is dependent on the quantity of thioglucoside in the meal.

The soluble metal compounds may be added dry to the meal as it is conveyed to the cooker or it may be dissolved in the water which is added to increase the moisture content of the meal.

The catalytic decomposition may be carried out at temperatures ranging from about 200° to 275° F. but the preferred temperature ranges between from about 200 to 220° F. In order to achieve these temperatures, the process may be carried out in "stack-cookers." These consist of a series of superimposed cylindrical steel kettles independently jacketed for steam heating. The crushed seed is agitated by a sweep-type stirrer in each kettle. Automatically operated gates provide a continuous progression of the seed down through the kettles. The top kettle is provided with spray jets for the addition of moisture and each of the lower kettles is provided with an exhaust pipe for removal of moisture. Normally oil seeds are moistened in the early stages of cooking and their moisture content reduced during cooking. In the present process the moisture content at the start ranges from about at least 15% to 40% and at the end is allowed to air dry to a moisture content of about 10%. In the present invention, the residence time in the cooker, exclusive of the drying time is about 10 to 15 minutes.

The treatment may be applied as an additional step in the processing of oil seed meal, for instance, it may be applied to meal which has had all the conventional treatment steps applied and hence has just been desolventized and is still hot; or it may be applied to meal which has been conventionally treated and stored. Thus, the process of the invention eliminates the problem arising from the introduction of myrosinase in animal rations through the addition of screenings, as the meal no longer contains any thioglucosides. It also results in a meal which is more palatable to animals.

EXAMPLE 1

This treatment was conducted on a small laboratory scale. 1 part $FeSO_4$ dissolved in 10 parts water were well mixed with 100 parts of commercial rapeseed meal containing 2.5% thioglucosides. The meal was then steam stripped for 10 minutes and air dried. The resulting meal contained only 0.1% thioglucosides and traces of volatile nitriles.

EXAMPLE 2

This example is a test of the process on an industrial scale. A five high stack cooker was employed so that about 9 tons of meal were processed. In this case the ferrous sulphate, as the crystalline heptahydrate, was added dry to the meal as it was conveyed to the cooker. The temperature and moisture content of meal were raised to 210° F. and 30% with steam and water and held under these conditions for 10 minutes. The meal was then dried in subsequent kettles of the cooker. Initially 2% $FeSO_4 \cdot 7H_2O$ was added and this was reduced to 1.0 and to 0.6%. For all three levels no thioglucosides could be found in the dried meal by chemical analysis.

(A) Nutrient content: Samples of rapeseed meal, before and after treatment with iron salts and steam, were analyzed for the more important nutrients as they relate to practical feeding problems (Table 1).

TABLE 1.—NUTRIENT COMPOSITION OF COMMERCIAL AND TREATED RAPESEED MEALS (dry matter basis)

| Nutrients | Control meal | Treated meal |
| --- | --- | --- |
| Proximate analysis: | | |
| Protein (N×6.25), percent | 39.8 | 39.0 |
| Crude fibre, percent | 14.4 | 16.1 |
| Crude fat, percent | 3.0 | 2.4 |
| Ash, percent | 6.6 | 7.9 |
| Nitrogen-free extract, percent | 36.2 | 34.6 |
| Vitamins: | | |
| Thiamin, mg./kg | 8.4 | 6.7 |
| Riboflavin, mg./kg | 4.6 | 4.1 |
| Niacin, mg./kg | 167 | 162 |
| Amino acids: | | |
| Threonine, percent | 1.59 | 1.47 |
| Alanine, percent | 1.58 | 1.61 |
| Valine, percent | 1.73 | 1.75 |
| Cystine, percent | .25 | .21 |
| Methionine, percent | .56 | .65 |
| Isoleucine, percent | 1.38 | 1.41 |
| Leucine, percent | 2.56 | 2.62 |
| Phenylalanine, percent | 1.38 | 1.41 |
| Lysine, percent | 2.31 | 2.30 |
| Histidine, percent | 1.01 | 1.03 |
| Arginine, percent | 2.22 | 2.17 |
| Isothiocyanate, mg./gm | 3.4 | 0 |
| Oxazolidinethione, mg./gm | 2.6 | 0 |

The differences that occur between the two meals appear to be relatively minor and likely attributable to the dilution effect of the added iron salts and to normal errors associated with sampling and analysis.

The most significant change relative to nutritive value is the effect of iron treatment on the thioglucoside content. The conversion of the thioglucosides to products no longer subject to myrosinase action and no longer able to exert goitrogenic or growth inhibition effects represents a significant improvement in the feeding value of the meal.

(B) Feeding trials with mice: Samples of meal, control and iron-treated, were incorporated into diets together with a protein-free basal fraction so as to apply a maximum test to palatability and nutritive value of the meals. The diets contained 18 percent protein, supplied entirely from rapeseed meal, and otherwise corresponded to the diets routinely used in our laboratory for assessing protein quality. The results of this experiment are shown in Table 2.

TABLE 2.—RESULTS OF FEEDING TRIAL WITH MICE IN 14-DAY TEST

| | Control meal | Treated meal |
| --- | --- | --- |
| Response criteria: | | |
| Weight gain, gm | 8.8 | 10.2 |
| Feed intake, gm | 38 | 43 |
| Feed efficiency, feed/gain | 4.5 | 4.2 |

The mice fed the treated meal ration consumed significantly more feed ($P \leq .05$), implying better palatability, but the apparent advantages in growth and feed efficiency did not attain statistical significance at $P = .05$. Larger numbers of animals with similar responses would of course, have resulted in a more favourable interpretation in this regard.

(C) Palatability trials with weanling pigs: Using pelleted starter rations containing 20 percent protein and including (a) 16.4% soybean meal, (b) 20% commercial rapeseed meal or (c) 20% iron-treated rapeseed meal, two groups of 10 and 13 weanlings were offered their choice of the three rations. The self-feeders containing the three rations were randomly re-located daily within each pen to force the pigs to seek out the preferred ration each day.

For the first two weeks the pigs consumed only the soybean meal ration. Upon removal of the soybean ration feeders the pigs made an immediate and complete choice of the iron-treated ration and continued to eat and gain normally.

These results confirmed those obtained with mice, indicating improved palatability and indicating that nutrient content has not been adversely affected by the treatment.

(D) Preliminary feeding trial on market pigs: Using practical rations similar to those employed in the test with weanlings and containing (a) 12% soybean meal, (b) 15% commercial rapeseed meal and (c) 15% iron-treated rapeseed meal, a test was conducted on pigs weighing between 75 and 200 pounds. Four pigs were allotted to each ration and records were kept of gains and feed consumption over a 52-day period.

The average daily gains for all groups ranged between 1.7 and 1.9 pounds per day, a rate slightly above the typical of Yorkshire pigs, according to a recent survey. Likewise feed efficiency was 3.2 pounds feed per pound gain for all groups, a favourable response in relation to the current national average of 3.29 for pigs on R.O.P. test in Canada.

What we claim as our invention is:

1. In the process of treating oil seed containing thioglucosides and an enzyme capable of hydrolyzing said thioglucosides including not more than about 2% by weight progoitrin to produce a proteinaceous product suitable for animal foodstuffs including the steps of crushing the seed, dry cooking the crushed seed to increase the permeability of the cell walls thereof to oil and to inactivate the enzyme, recovering oil from the crushed meal and drying the deoiled meal, the improvement which comprises decomposing the thioglucosides by catalytic treatment with iron or copper compounds at a temperature between about from 200° to 275° F. and at a moisture content of at least about 15%, and removing steam volatile nitriles thus produced.

2. A process as claimed in claim 1 wherein the oil seed is rapeseed.

3. A process as claimed in claim 1 wherein the oil seed is *Brassica juncia*.

4. A process as claimed in claim 1 wherein the oil seed is *Brassica campestris*.

5. A process as claimed in claim 1 wherein a soluble iron compound is employed as the catalyst in an amount equivalent of 0.01% to 0.4% by weight iron.

6. A process as claimed in claim 1 wherein a soluble copper compound is employed as the catalyst in an equivalent to 0.01% to 0.4% by weight copper.

7. A process as claimed in claim 1 wherein a mixture of a soluble iron compound and a soluble copper compound is employed as the catalyst in an amount equivalent to 0.01% to 0.4% by weight iron plus copper.

8. A process as claimed in claim 1 wherein a soluble iron salt is employed as the catalyst in an amount equivalent to 0.01 to 0.4 by weight iron.

9. A process as claimed in claim 1 wherein 0.045 to 2.0% by weight $FeSO_4 \cdot 7H_2O$ is employed as the catalyst.

10. A process as claimed in claim 1 wherein a soluble copper salt is employed as the catalyst in an amount equivalent to 0.01% to 0.4% by weight copper.

11. A process as claimed in claim 1 wherein 0.04% to 1.6% by weight $CuSO_4 \cdot 5H_2O$ is employed as the catalyst.

12. A process as claimed in claim 1 wherein a mixture of crystalline $FeSO_4$ and $CuSO_4$ is employed as the catalyst in an amount equivalent to 0.01 to 0.4% by weight metal.

13. A process as claimed in claim 1 wherein the decomposition is carried out at a temperature of about 210° F. and a moisture content of about 30% by weight.

14. A process as claimed in claim 1 wherein the moisture content at which the catalytic decomposition occurs ranges from at least 15% to about 40% by weight.

15. A catalytically heat treated stam-stripped oil seed meal in which an enzyme capable of hydrolyzing thioglucosides has been inactivated, said meal having been heat treated in the presence of an iron or copper compound, suitable for use in animal foodstuffs substantially free of thioglucosides, isothiocyanates and oxazolidinethione and nitriles being present in an amount of not more than about 0.5% by weight.

16. A treated rapeseed as claimed in claim 15.

17. A treated *Brassica campestris* oil seed as claimed in claim 15.

18. A treated *Brassica juncia* oil seed as claimed in claim 15.

References Cited

UNITED STATES PATENTS

| | | | |
|---|---|---|---|
| 2,987,399 | 6/1961 | Goering | 99—2 |
| 3,173,792 | 3/1965 | Mustakas et al. | 99—2 |
| 3,392,026 | 7/1968 | Mustakas et al. | 99—2 |

FOREIGN PATENTS

| | | | |
|---|---|---|---|
| 883,836 | 12/1961 | Great Britain | 99—2 |

OTHER REFERENCES

G. C. Mustakas, L. D. Kirk, V. E. Sohns, and E. L. Griffin, Jr. "Mustard Seed Processing: Improved Methods for Isolating the Pungent Factor and Controlling Protein Quality," pp. 1–5.

NORMAN YUDKOFF, Primary Examiner

C. P. RIBANDO, Assistant Examiner

U.S. Cl. X.R.

99—17; 260—123.5, 465.9